United States Patent Office 3,241,928
Patented Mar. 22, 1966

3,241,928
PREPARATION OF FIBROUS TITANIUM
DIOXIDE
Donald C. Pease, Wilmington, Del., assignor to E. I. du
Pont de Nemours and Company, Wilmington, Del., a
corporation of Delaware
No Drawing. Filed Sept. 28, 1962, Ser. No. 227,050
8 Claims. (Cl. 23—305)

This invention relates to a process for the preparation of fibrous titanium dioxide by crystallization of preformed titanium dioxide.

Fibrous titanium dioxide, which has recently been prepared by oxidation of titanium halides and by metathesis of titanium tetrachloride and boric oxide, possesses properties of stability at elevated temperatures, high reflectance for infrared radiation and easy feltability which render it useful in applications where a highly refractory asbestos-type material is required. Such applications include uses as thermal insulation, as a reinforcing component of ceramics, cermets, plastics, paper and other fiber compositions, and as a filtering medium, particularly for high temperature filtrations. In view of these valuable properties and opportunities for wide application, it is desirable to provide new processes for the preparation of fibrous titanium dioxide, particularly processes which utilize readily available, low cost materials.

The present invention provides such a process for preparing fibrous titanium dioxide by recrystallization of preformed titanium dioxide from a molten mixture of boric oxide and at least one metal halide selected from the halides of alkali and alkaline earth metals. Fibrous titanium dioxide is readily obtained when the molten mixture contains in addition to boric oxide at least two metal halides and processes employing such mixtures are a preferred embodiment of the invention.

The titanium dioxide used in the process of this invention is preferably in a finely divided, particulate form since such form is most readily soluble in the reaction media employed. Grades of titanium dioxide having an average particle size below about one micron are particularly satisfactory. However, coarser forms containing particles up to about 10 microns or more can also be employed. The titanium dioxide selected as starting material should be dry to avoid introduction of moisture into the melt. Adequate drying can be accomplished by heating the starting material for a few hours to a temperature of 400–500° C. Titanium dioxide of the usual commercial purity is satisfactory for use in this invention.

In carrying out the invention, the titanium dioxide starting material is dissolved in a molten mixture of boric oxide ($B_2O_3$) and at least one halide of a metal selected from alkali and alkaline earth metals. The halides most useful are the chlorides and fluorides of lithium, sodium, potassium, magnesium, calcium, strontium, and barium. Examples of useful halides are sodium fluoride, sodium chloride, potassium fluoride, potassium chloride, calcium chloride, magnesium chloride, lithium fluoride, and lithium chloride. When melts containing more than one metal halide are employed, the halogens and the metals in the halides may be the same or different.

Boric oxide and the metal halide(s) as defined above are employed in a proportion ranging by weight from 1:9–9:1 (boric oxide:total metal halide). This proportion will ordinarily be in the range of 5:1–1:5 and mixtures containing approximately equal proportions of boric oxide and metal halide(s) have been found very effective. The mixture should be in the liquid state, preferably in the range of 500° to 1700° C. The range of 1100–1400° C. has been found particularly satisfactory. Usually the molten mixture containing titanium dioxide starting material will be heated to a temperature above 1000° C., for example, a temperature in the range of 1250–1340° C., for a few minutes and then allowed to cool to a temperature of 1000° C. or below.

The process of this invention can be carried out at atmospheric pressure and it is not necessary to provide the facilities for maintaining superatmospheric or subatmospheric pressures. However, it is often desirable to conduct the process in a container protected from the atmosphere in order to avoid contamination with atmospheric moisture and resultant likelihood of titanate formation. It is sometimes convenient to achieve this protection from atmospheric moisture by conducting the recrystallization in closed vessels at subatmospheric or moderate superatmospheric pressures such as pressures up to about 10 atmospheres. These pressures are also advantageous when the temperature selected for recrystallization is such that decomposition of titanium dioxide with release of oxygen would occur if atmospheric pressure were employed.

The titanium dioxide fibers produced by the process of this invention have a fiber cross-section of less than 25 microns and an axial ratio, i.e., a ratio of length to cross-sectional dimension of at least 10:1. The cross-sectional dimension of the fibers is measured by allowing a number of fibers to settle from aqueous suspension onto a microscope slide and examining the fibers on the slide at an appropriate magnification. The cross-sectional dimension is estimated by comparison with standard fibers of known cross-sectional dimension or with a suitable scale. It will be apparent that the cross-sectional dimension measured in this way for cylindrical fibers will be a fiber diameter and for non-cylindrical fibers, i.e., fibers having an ellipsoidal or rectangular cross-section will correspond usually to the long dimension of the cross-section. Preferred fibers have a cross-section less than 5 microns. For the most part the fibers range in length from 0.2 mm. to 5 mm. or more. These fibers can be formed into mats or felts possessing outstanding utility as thermal insulation and preferred fibers for such uses have axial ratios in excess of 100:1 up to as high as 500:1 or more. Individual fibers are colorless but when matted together appear white. When certain impurities, notably iron, are present, mats of fibers may have a distinctly yellowish appearance.

The following examples further illustrate the new process of this invention.

EXAMPLE 1

A platinum capsule with internal diameter of ⅜″, wall thickness of 0.011″, and length of about 3″ was charged with 0.38 g. of KCl, 0.38 g. of $B_2O_3$, and 0.05 g. of $TiO_2$. Before use, the KCl and $B_2O_3$ were dried by heating at 950° C. for 30–60 minutes in a platinum dish and and cooled in a desiccator over $CaCl_2$. The $B_2O_3$ melt was cast into a porcelain evaporating dish before being placed in the desiccator. Both materials were ground and stored under anhydrous conditions. $TiO_2$, in anatase form, was obtained by washing acid cake from the sulfate process free from sulfuric acid and the drying the white solid at 450° C. for 8 hours. The sulfate process, from which acid cake is obtained, comprises treating a titaniferous ore, such as ilmenite, with $H_2SO_4$ to give a dry mass which is dissolved in water and hydrolyzed under controlled conditions. Calcination of the filter cake remaining after separation of soluble impurities gives pigmentary $TiO_2$.

The platinum capsule containing the above ingredients was sealed except for a pinhole, which prevented pressure build-up in the capsule and minimized salt evaporation. The capsule and contents were heated in a platinum resistance furnace to a temperature of 1360° C. for 10 minutes, then removed, and cooled in air to room temperature. The capsule was opened, and the contents extracted successively with hot water, hot 5% aqueous NaOH, and finally hot water. Material which remained from water extraction was examined under a microscope at 430× magnification. The fibrous crystals ranged from about 0.8–5.4 microns in cross-section and from 37–70 microns in length. It was estimated that about 25% by weight of the material in the solid was fibrous. A fibrous crystal was ground in a mortar and an X-ray diffraction pattern was taken on the powder. A strong pattern for rutile was obtained.

EXAMPLE 2

The platinum capsule of Example 1 was charged with 0.06 g. of $TiO_2$, 0.25 g. of $B_2O_3$, 0.25 g. of NaCl, and 0.25 g. of KCl, all dried and of quality similar to materials described for Example 1. The platinum capsule, sealed except for a pinhole, was heated at 1320–1340° C. for 20 minutes. The tube was then removed from the furnace and cooled in air. Components soluble in hot water and hot 5% NaOH were extracted, and the residual material was examined under a microscope at 430×. Many fibrous crystals were seen with maximum cross-section of about 1.6 microns and maximum length of 45 microns.

EXAMPLE 3

Dried components comprising 1.5 g. of $TiO_2$ (anatase) and 20 g. of $B_2O_3$ were heated in an open platinum dish for 30 minutes at 800° C. After adding 14.3 g. of KCl, 4.1 g. of NaCl, and 3.7 g. of NaF (also dried), the mixture was further heated for one hour at 800° C. The mixture was transferred to a platinum boat and placed in a platinum resistance tube furnace at 1310° C. and held there for about two minutes. Power to the furnace was turned off, and the reaction mixture was retained in the furnace until it cooled to room temperature. Material remaining after extraction with hot water was examined microscopically. Fibrous crystals with cross-sections in the range of 1–2 microns and in lengths ranging from 100–1200 microns were obtained.

EXAMPLES 4, 5, and 6

Fibers similar to those of the preceding examples were made by recrystallization of preformed $TiO_2$ from boric oxide and potassium chloride or from boric oxide, potassium chloride, and sodium chloride melts. The results are summarized in Table I.

*Table I.—Preparation of $TiO_2$ Fibers*

| Example No. | $TiO_2$ [1] (g.) | Solvent (g.) | Temp.[2] (° C.) | Cooling | Fibrous product [3] | |
|---|---|---|---|---|---|---|
| | | | | | Length ($\mu$) | Cross-sectional dimension ($\mu$) |
| 4 | 0.05 | KCl, 0.57<br>$B_2O_3$, 0.19 | 1,330 | Removed from furnace at 1,330° C. | 25–80 | 1–8. |
| 5 | 0.3 | KCl, 1.4<br>NaCl, 0.9<br>$B_2O_3$, 2.3 | 1,340 | To 1,000° C. in one hr., to 800° C. in 0.5 hr. more and removed from furnace. | Up to 500 | Range of 5.[4] |
| 6 | 0.1 | KCl, 0.15<br>$B_2O_3$, 0.15 | 1,350 | To 1,150° C. in 10 min., to 1,000° C. in 50 min. more and removed from furnace. | Up to 250 | Range of 6.[5] |

[1] In Examples 4 and 5, anatase as in Example 1 was used; in Example 6, rutile, prepared by oxidation of $TiCl_4$, was used.
[2] The temperature indicated was maintained for 10 minutes. In Examples 4 and 5, evacuated, sealed platinum capsules were used, while in Example 6 the capsule was as described in Example 1.
[3] As observed by microscopic observation at a magnification of 430×.
[4] The majority of the fibers had a cross-section of about $5\mu$. One fiber examined by X-ray had the rutile structure and was apparently a single crystal.
[5] The majority of the fibers had cross-section of about $6\mu$.

The new process of this invention utilizes readily available, economical materials to give high yields of excellent quality feltable fibrous titanium dioxide which is useful in high temperature thermal insulation and in reinforcement of plastics, metal, glass, and ceramics.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing titanium dioxide fibers which comprises:
    (a) preparing at a temperature above 1000° C. a molten mixture containing dissolved preformed titanium dioxide, boric oxide, and at least one metal halide selected from the group consisting of alkali metal halides and alkaline earth metal halides; and
    (b) cooling the molten mixture to a temperature below 1000° C., whereupon titanium dioxide fibers crystallize from the cooled mixture.

2. Process of claim 1 wherein at least two metal halides are present in the molten mixture.

3. Process for preparing titanium dioxide fibers which comprises:
    (a) preparing at a temperature above 1000° C. a molten mixture containing dissolved preformed titanium dioxide, boric oxide, and at least one metal halide selected from the group consisting of alkali metal halides and alkaline earth metal halides, said molten mixture ranging in proportion by weight of boric oxide to total metal halide from 1:9 to 9:1; and
    (b) cooling the molten mixture to a temperature below 1000° C., whereupon feltable titanium dioxide fibers crystallize from the cooled mixture.

4. Process of claim 3 wherein the proportion by weight of boric oxide to total metal halide in the molten mixture ranges from 1:5 to 5:1.

5. Process of claim 3 wherein the preformed titanium dioxide is in the form of dry, finely divided particles having an average particle size of less than one micron prior to dissolution.

6. Process of claim 3 wherein the molten mixture, including dissolved titanium dioxide, is heated to a temperature in the range of 1250 to 1360° C.

7. Process of claim 3 wherein the molten mixture contains potassium chloride.

8. Process of claim 2 wherein the molten mixture contains potassium chloride and sodium chloride.

References Cited by the Examiner

UNITED STATES PATENTS 3,012,857   12/1961   Pease _____ 23—202
3,065,091   11/1962   Russell et al. _____ 23—202

OTHER REFERENCES

Mellor: "Comprehensive Treatise on Inorganic and Theoretical Chemistry," vol. 7, QD 31 M4, pages 30–34—1928.

NORMAN YUDKOFF, *Primary Examiner.*